A. McWILLIAMS.
Fruit-Gatherer.
No. 3,478
Patented Mar. 13. 1844.
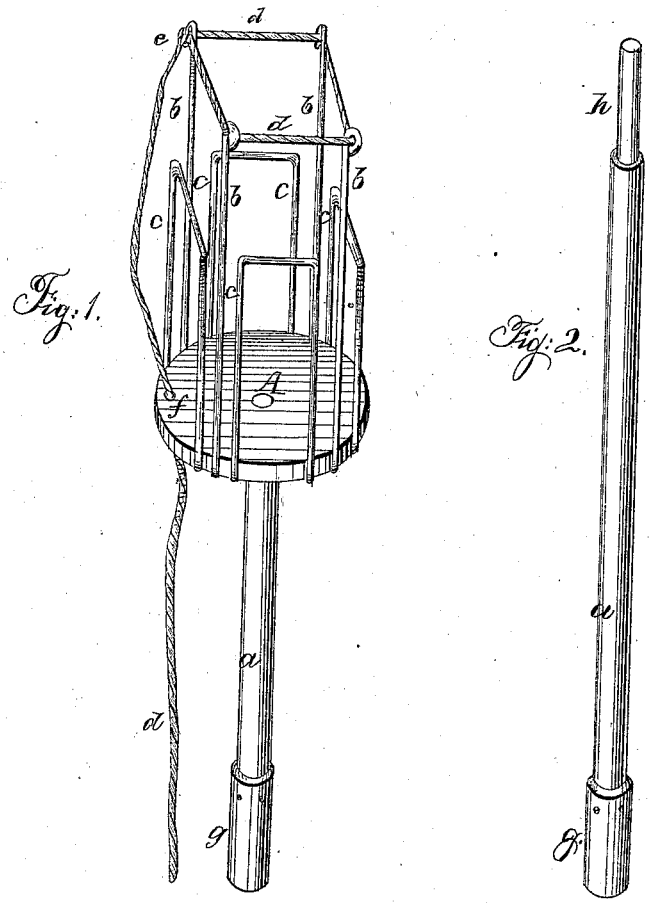

UNITED STATES PATENT OFFICE.

ALEX. McWILLIAMS, OF WASHINGTON COUNTY, DISTRICT OF COLUMBIA.

IMPROVEMENT IN FRUIT-GATHERERS.

Specification forming part of Letters Patent No. 3,478, dated March 13, 1844.

*To all whom it may concern:*

Be it known that I, ALEXANDER McWILLIAMS, of the county of Washington, in the District of Columbia, have invented a new and useful Apparatus for Gathering Fruit, which I call a "Fruit-Gatherer;" and I do hereby declare that the following is a full, clear, and exact description of the construction and operation of the same, reference being had to the annexed drawings, making a part of this specification, in which—

Figure 1 is a view of the apparatus entire, and Fig. 2 an elongating staff or rod.

On the end of rod or staff *a* a circular piece of board about one and a half inch thick and six inches in diameter is fitted by a hole in its center, forming the bottom A of the apparatus. Near the upper edge of bottom A, and at equal distances from each other, four or more elastic metallic wires, *b*, about twelve inches long, are inserted at right angles with the bottom A, and are intended for grasping-rods. On the upper end of each of the grasping-rods *b* there is a ring turned inward, formed by simply bending the end of the wire, and one of them may be furnished with an additional ring, *e*, or the same purpose may be answered by bending one of the rings formed from the wire to a position parallel with the bottom A. Through these rings a cord, *d*, is passed, its two ends meeting at the last-described grasping-rod, and passing together through the ring *e* (or the horizontal ring) in the same direction. They are tied together, and a single cord is then extended downward to any required length, passing through a hole, *f*, near the periphery of the bottom, as shown in Fig. 1, or through a staple inserted horizontally in the edge of the bottom A. Between the grasping-rods *b* there are four wire guard-rods, *c*, each bent into the shape of an oblong square staple, the ends of which are inserted in bottom A. As these guard-rods are intended only to form a receptacle for the fruit, there may be substituted a hollow cylinder of tin, or a wire-netting, to be placed over the grasping-rods; or, if preferred, a bag may be so attached to the bottom A as to receive the fruit. The staff *a* is made of wood, and is about one and a half inch in diameter, and may be extended by means of a ferrule, *g*, and an additional staff, as shown in the drawings, the ferrule being placed on the lower end of staff *a*, Fig. 1, and the end *h* of the elongating staff, Fig. 2, being inserted in the other end of the ferrule *g*.

The grasping-rods *b* and the guard-rods *c* may be made of brass or iron wire, whalebone, or any other suitable material, and the bottom A may be made either of the above-described material and shape, or in the form of a cup with a cushion, or in any way that shall form a convenient and suitable receptacle for the fruit.

Operation: The staff or rod *a* being held by one or both hands, the apparatus is raised toward the fruit desired to be gathered in such a manner that the fruit shall pass into the opening of the grasping-rods *b*. The cord *d* is then pulled, which causes the upper ends of the grasping-rods to contract until the rings at the ends of the grasping-rods meet and grasp the stem of the fruit, when the whole apparatus is drawn downward until the fruit parts from the branch. The cord *d* is then relaxed, the wires from their elasticity resume their natural position, and the fruit drops into the receptacle formed by the bottom A and the rods *b* and *c*. This operation is continued until the receptacle is full, when the apparatus is taken down and emptied, and filled at pleasure in the same manner.

What I claim as my invention, and desire to secure by Letters Patent, is—

The combination of grasping-wires and strings with a handle of any convenient form for the purpose of grasping objects which cannot be conveniently reached by the hand, the construction and operation being substantially as described in this specification.

ALEX. McWILLIAMS.

Witnesses:
R. I. YOUNG,
CLEMT. T. COOTE.